United States Patent [19]

Abt et al.

[11] Patent Number: 4,745,659
[45] Date of Patent: May 24, 1988

[54] MACHINE FOR FILLING RECEPTACLES OR SAUSAGE SKINS WITH SAUSAGE MEAT

[75] Inventors: Franz Abt, Schemmerhofen; Manfred Kern, Ummendorf; Robert Klingele, Ringschnait; Georg Staudenrausch, Rissegg, all of Fed. Rep. of Germany

[73] Assignee: Albert Handtmann Maschinenfabrick GmbH & Co. KG., Biberach a.d. Rib, Fed. Rep. of Germany

[21] Appl. No.: 935,349

[22] Filed: Nov. 26, 1986

[30] Foreign Application Priority Data

Jan. 17, 1986 [DE] Fed. Rep. of Germany ....... 3601313

[51] Int. Cl.$^4$ ............................................. A22C 25/00
[52] U.S. Cl. ........................................................ 17/35
[58] Field of Search ............... 17/33, 35, 49; 222/164, 222/165

[56] References Cited

U.S. PATENT DOCUMENTS

| 2,323,233 | 6/1943 | Miller | 222/165 |
| 2,345,074 | 3/1944 | Sargent et al. | 222/165 |
| 3,034,171 | 5/1962 | Rosenthaler | 17/35 |
| 3,147,890 | 9/1964 | Mittelsteadt | 222/165 |
| 3,162,894 | 12/1964 | Hutchins et al. | 17/35 |
| 3,251,579 | 5/1966 | Lasar . | |
| 3,424,294 | 1/1969 | Felstehausen . | |
| 3,450,180 | 6/1969 | Braun . | |

FOREIGN PATENT DOCUMENTS

| 406697 | 10/1967 | Australia . |
| 0129703 | 1/1985 | European Pat. Off. . |
| 267290 | 1/1913 | Fed. Rep. of Germany . |
| 424782 | 2/1926 | Fed. Rep. of Germany . |
| 1299086 | 6/1962 | France . |
| 182033 | 1/1936 | Switzerland . |

Primary Examiner—Willie G. Abercrombie
Attorney, Agent, or Firm—Finnegan, Henderson, Farabow, Garrett & Dunner

[57] ABSTRACT

In a machine for filling sausage skins with sausage meat having a main part provided with a discharge means, a storage receptacle arranged on the main part, and a transport means for transporting the sausage meat from the storage receptacle to the discharge means, the improvement comprising in the upper part of the storage receptacle a wall component of the receptacle adapted to be pivoted away.

10 Claims, 4 Drawing Sheets

MACHINE FOR FILLING RECEPTACLES OR SAUSAGE SKINS WITH SAUSAGE MEAT

BACKGROUND OF THE INVENTION

The present invention refers to a machine for filling or stuffing receptacles or casings, such as sausage skins with sausage meat, comprising a machine main part having provided therein a discharge means, a storage receptacle arranged on said machine main part, and a transport element for transporting the sausage meat from said storage receptacle to said discharge means.

In the case of such machines, it is well-known and common practice that a storage receptacle having e.g. the form of a funnel is provided on the machine main part, said storage receptacle being adapted to be filled with a sufficiently large amount of sausage meat. The sausage meat filled in flows out at the bottom of the storage receptacle and, with the aid of a transport element, it is transported to a discharge means, where adequate portions thereof can be filled e.g. into a sausage skin or into a receptacle.

In order to be able to continue the sausage meat fill-in process as long as possible and with as much sausage meat as possible, it is desirable that the largest possible amount of sausage meat can be accommodated in the storage receptacle. Hence, a larg-volume storage receptacle is, in principle, desirable, but an increase in the receptacle volume inevitably entails an increase in the receptacle height. However, the difficulties arising when the storage receptacle is filled by hand or e.g. cleaned will increase in proportion to the increase in the height of said storage receptacle. Hence, industrial machines are in most cases equipped with a feed means with the aid of which appropriate sausage meat carriages are used for feeding the filling machines. In smaller enterprises, e.g. speciality shops, the storage receptacles are normally filled by hand.

Hence, up to now such machines have been used in practical operation with a storage receptacle whose height of construction was limited to such an extent that it was possible to fill said storage receptacle by hand without any major difficulties, and in order to achieve this comparatively small volumes were put up with.

The comparatively small height of construction of known storage receptacles additionally necessitates that the top of said receptacles must be covered at least by a grid or something like that so as to observe the relevant rules for the prevention of accidents. These rules prescribe that, when the machine is in operation, any possibility of an operator reaching with his arms through the funnel and up to the transport element must be excluded so that shop accidents are reliably prevented.

Hence, the prior art employed the measure of placing onto the storage receptacle a grid whose openings were so small that it was not possible to put one's hands through these openings.

It follows that, in the case of this known machine, the capacity of the storage receptacle was not particularly large on the one hand, and, on the other hand, it was not possible to charge the storage receptacle through the grid. For the purpose of charging, the grid had to be removed or pivoted away. When the grid was removed or pivoted away, the drive motor of the machine was simultaneously switched off by means of a limit switch.

An additional disadvantage of this known machine is to be seen in the fact that the practically realizable filling volume must be limited more strictly than the real volume of the funnel. This is due to the fact that, when the funnel is filled completely, it may happen that some sausage meat material is pushed over the rim of the funnel, since in the case of these feeding funnels, it is common practice to transport the sausage meat to the flowout side with the aid of a conveying element which is arranged within said funnel. Due to the fact that, in view of the high torques which would otherwise be necessary, the conveying element does normally not extend over the full height of the funnel, a rotary vane member, which rotates on the funnel wall, is moved by the conveying element for the purpose of avoiding bridge formation, said rotary vane member destroying bridges which may form in the raw sausage and guaranteeing thus that the whole amount of material can be transported to the outlet. In cases in which the funnel is filled completely, this rotary vane member would have the effect that part of the material filled in is raised and could thus flow over the rim.

The present invention is based on the task of providing a machine of the type mentioned at the beginning, which can be filled easily, which fulfills the relevant safety regulations and which still offers a large supply volume for the sausage meat material to be filled in skins or receptacles.

SUMMARY OF THE INVENTION

This task is solved according to the invention by a machine for stuffing casings with meat comprising a housing having means for discharging meat into the casings, a storage receptacle having side walls and mounted on said housing for holding a supply of the meat, and transport means for receiving the meat from the storage receptacle and transporting it to the discharge means, in which the lower portions of the side walls of the storage receptacle are fixed with respect to the housing with at least a part of the upper portions of side walls being pivotally mounted with respect to the lower portions of the side walls so that the part can be swung away to provide access to the interior of the storage receptacle at a level lower than the top of the side walls of the receptacle.

Due to this measure it is first of all achieved that a storage receptacle can be used, which has a large volume and, consequently, a comparatively high height of construction. The overall height of construction of the storage receptacle can then be chosen such that, even if an operator reaches over the upper rim of the storage receptacle while the machine is in operation, he will not be able to reach down to the transport element. Hence, it is possible to guarantee the safety regulations without using any grid or any other type of cover for the storage receptacle. The simple possibility of filling is guaranteed due to the fact that, in the upper part of the storage receptacle, at least part of the receptacle wall is adapted to be pivoted away. Due to the pivoting away of such a wall component, an opening is formed and, consequently, a filling edge which extends at a lower level than the upper edge of the storage receptacle. Hence, when said wall component has been pivoted away, it is possible to fill, over this filling edge extending at a lower level, into the storage receptacle most of the amount of the sausage meat to be filled in. When the filling level has reached the height of the filling edge, the wall component, which had first been pivoted away, can be pivoted back for closing the opening so that the storage receptacle wall is then again circumferentially closed up to the upper edge of the storage receptacle. The residual amount of the sausage meat to be filled-in can then be filled in additionally over the upper edge of the storage receptacle. Although the height which has to be overcome is now greater, there is only a small amount of sausage meat left so that no extraordinary effort is required for this filling operation. It follows that, in spite of the simple possibility of filling, the volume of the storage receptacle can substantially be enlarged. Moreover, the advantage—which has already been mentioned hereinbefore—is provided, viz. that the storage receptacle wall can remain open at the top, since, due to the great height of construction, it is not possible to reach from the upper edge of the storage receptacle down to the transport element—not even if the storage receptacle is open. This has the consequence that the storage receptacle can be refilled without there being any necessity of stopping the transport element.

DESCRIPTION OF THE DRAWINGS

In the following, the invention will be further explained and described on the basis of the embodiments shown in the drawings, in which.

DETAILED DESCRIPTION OF THE INVENTION

Figure 1:
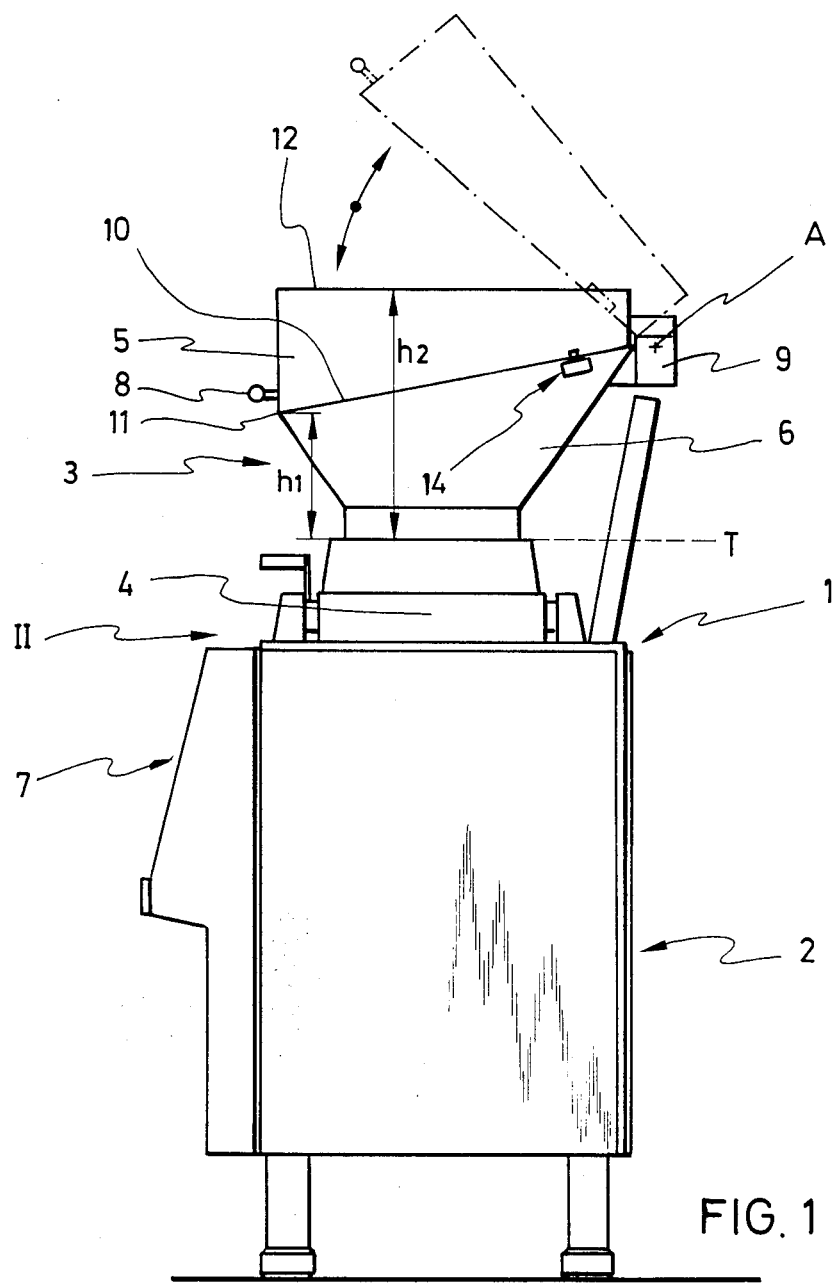
FIG. 1 shows a side view of a machine according to the invention.

In FIG. 1, reference numeral (1) refers to the machine according to the invention as a whole. The machine (1) is used for filling receptacles or sausage skins with sausage meat. It is provided with a machine main part (2) or frame accommodating the machine elements, which are required for carrying out the filling operation and which need not be explained in detail in the present connection. The desired sequences of operation can be adjusted and controlled via a control panel (7), which, too, is shown only schematically.

Figure 2:
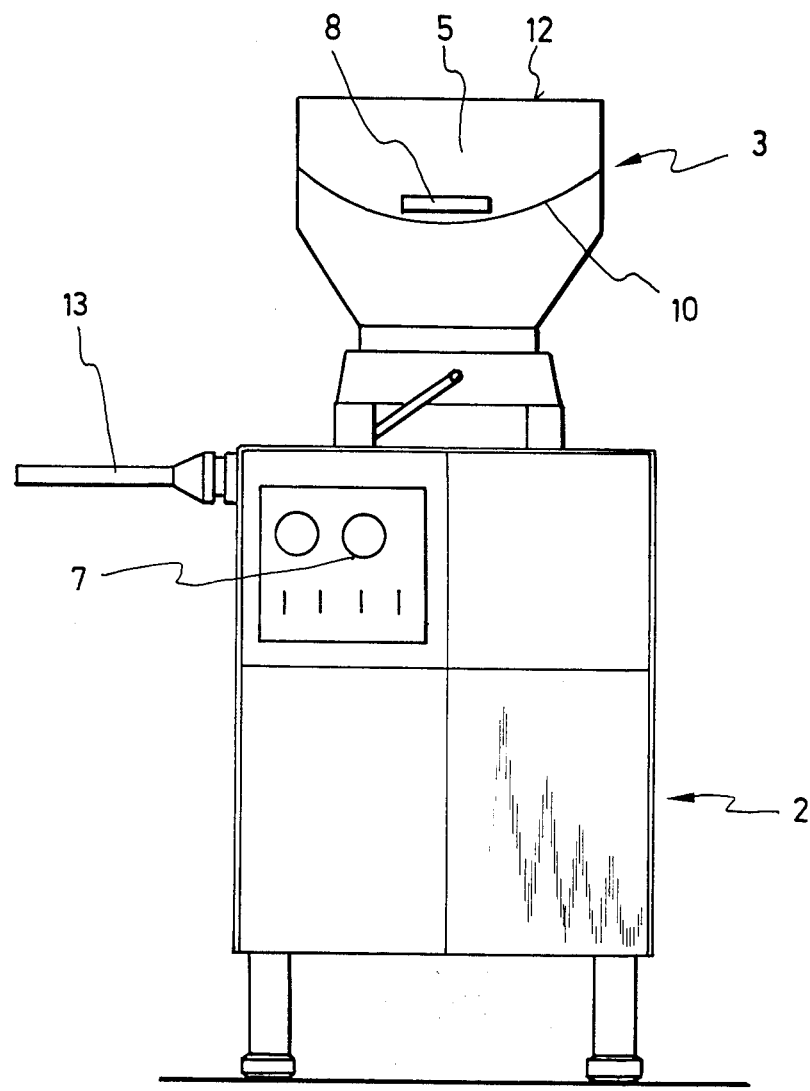
FIG. 2 shows a view of the machine in the direction of the arrow II of FIG. 1.

A storage receptacle (3) is arranged on top of the machine main part (2). The sausage meat is filled into this storage receptacle (3). At the lower end of the storage receptacle (3), approximately in the plane T, the sausage meat is removed with the aid of a transport element (4), which is not shown in detail, and is supplied to the twist-off nozzle (13), which is shown in FIG. 2, via filling cylinders, screw conveyors or the like, and at said twist-off nozzle it is filled into sausage skins or receptacles.

In the case of the embodiment shown, the storage receptacle (3) consists of two parts, the lower part (6) having the shape of a funnel and resting solidly on the machine main part (2). The funnel-shaped contour of the lower part (6) is extended upwards by an attachment (5), which has a cylindrical shape in the case of this embodiment and which delimits part of the volume of the receptacle, said attachment (5) being supported such that it is adapted to be pivoted about a joint (9) relative to the lower or stationary part (6). This attachment (5) is adapted to be pivoted upwards about the axis (A) of the joint (9) into the position shown by a dot-dash line in FIG. 1.

The cylindrical structural design of the attachment offers the advantage that no feed element is required in the cylindrical part, since the force of gravity of the sausage meat material is sufficient for the purpose of feeding. Moreover, the cleaning operation, which is carried out when the attachment has been pivoted upwards, can be effected in a much more advantageous manner when the attachment has a cylindrical form.

Also the stationary part can end in a cylindrical upward extension. This entails the advantage that the joints or the like, which are necessary for pivoting upwards the attachment, can be fixed to a substantially upright wall, and this is less difficult than fixing these members to an oblique funnel wall.

The bearing surface (10), by means of which the attachment (5) is in circumferential contact with the stationary part, extends such that it ascends towards the joint (9), i.e. the lower edge of the attachment (5) is provided with such a structural design that it extends obliquely in a manner corresponding to the upper edge of the stationary part (6).

As can be seen from FIG. 2, which shows a view of the machine in the direction of arrow II of FIG. 1, the storage receptacle (3) is arranged on the machine main part (2) in such a way that it is possible to open the attachment (5) with the aid of the handle (8) from the operating side of the machine. Hence, the laterally projecting twist-off nozzle (13) of the machine does not impede the filling operation.

Figure 3:
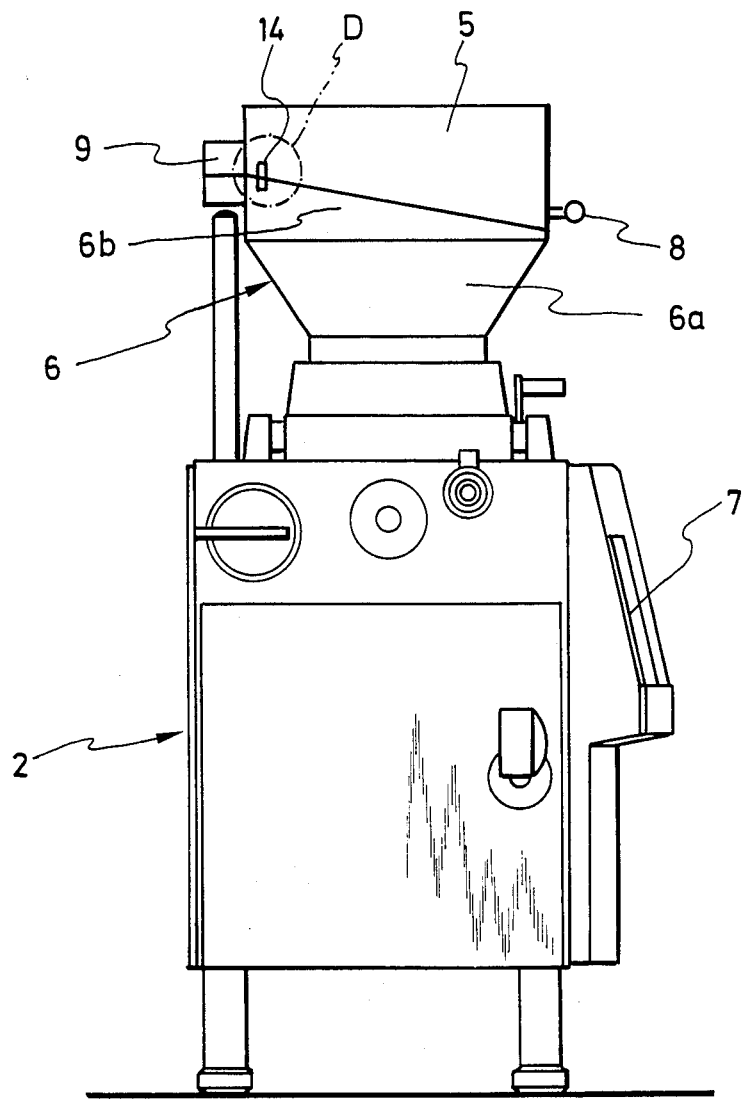
FIG. 3 shows a side view of the machine according to the invention in accordance with a second embodiment.

The embodiment according to FIG. 3 differs from the embodiment of FIGS. 1 and 2 in so far as the stationary part (6) is provided with a lower, funnel-shaped wall component (6a) whose upper edge extends essentially horizontally. This funnel-shaped part (6a) has formed integrally therewith the cylindrical extension (6b), which defines an upward extension of said part (6a) and the upper edge of which ascends towards the joint (9) in a manner similar to that shown in FIG. 1.

In the case of both embodiments, the joint (9) is equipped with an overrunning clutch with rolling elements, said overrunning clutch permitting free upward pivoting of the attachment, (5) in which case only the weight of the attachment (5) has to be overcome, and decelerating the movement in the opposite direction to such an extent that the attachment (5) can be caused to stay in any angular position.

Overrunning clutches with rolling elements of this type are known per se and, consequently, they need not be described in detail in the present connection.

Another component which is common to both embodiments is a safety switch, which, as a whole, is provided with reference numeral (14) and which effects deactuating of motor of the machine, in particular of the transport element, when the attachment (5) has been pivoted upwards relative to the stationary part (6) to an extent on the basis of which it would be possible that, at the point of the widest gap opening, an operator could pass his hand into the interior of the storage receptacle (3). As soon as such a pivotal angle has been reached, the safety switch automatically deactuates the machine.

In order to achieve this, a great variety of possible embodiments can be employed.

Figure 4:
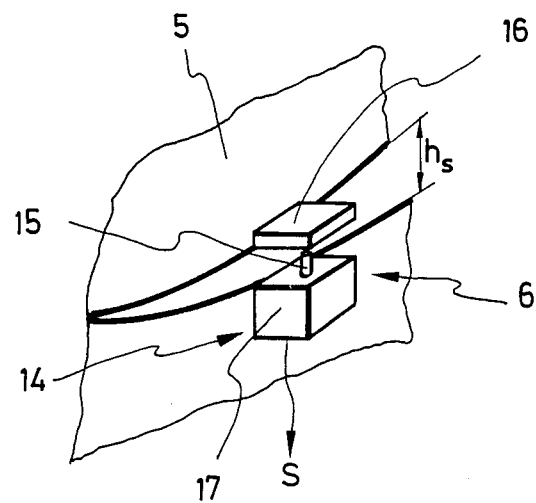
FIG. 4 shows a perspective view of a detail of the area D of FIG. 3.

The above-mentioned effect can be achieved e.g. by a safety switch (14) of the type shown in greater detail in FIG. 4. This safety switch (14) consists of a plate (16), which is fixedly connected to the attachment (5), and of a switch housing (17), which is, on one side thereof, fixedly connected with the stationary part (6) of the storage receptacle. The housing (17) has provided therein a switching pin (15), which, when the storage receptacle is close, is pressed into the housing (17) against the force exerted by a spring which is not shown. When the attachment (5) is opened, the pin (15) is forced out of the housing (17) with the aid of said spring. As soon as a maximum admissible gap opening ($h_S$) has been reached, the pin (15) triggers a signal (S) with the aid of contacts accommodated in the housing (17), and this signal deactuates the machine. This height ($h_S$) amounts, for example, to 6 cm at the point of the maximum gap opening so that it is, on the one hand, possible to look through the gap and into the interior of the storage receptacle while the machine is in operation and without any necessity of deactuating the machine. On the other hand, the machine is automatically deactuated whenever the gap opening would be large enough to permit an operator to pass through his hand.

It is clearly evident that this function of the safety switch can be caused by other possible switching arrangements or types of switches, e.g. by non-contacting switch means. The safety switch could, for example, also be integrated in the joint (9).

In the case of both embodiments, the machine can be operated as follows:

prior to starting operation of the machine, it is necessary to fill sausage meat into the storage receptacle (3). For this purpose, the operator can take hold of the handle (8) from the operating side on which the control panel (7) is arranged and can pivot the attachment (5) freely upwards about the axis (A) or rather the joint (9), e.g. to the position indicated in FIG. 1 by the dot-dash line.

If the machine was already in operation before or if the motor was switched on before, the safety switch (14) will react and deactuate the motor.

The stationary part of the storage receptacle (3) can then be filled easily over the filling edge (11), which extends at a low level, from the operating side on which also the control panel (7) is arranged. In view of the fact that, due to the oblique extension of the seat plane (10), the stationary part has the smallest depth on the filling side and ascends towards the joint (9), it is possible to fill in rather tough sausage meat from the low side of the stationary part in such a way that it can accumulate in the area of the higher edge, i.e. also in the area of the joint (9). It follows that, when the attachment (5) has been pivoted upwards, it is possible to fill in a volume of sausage meat which already exceeds the volume of the stationary part (6).

When the stationary part (6) has been filled, the attachment (5), which, due to the overrunning clutch with rolling elements, is held in its open position without any special locking measures and also without any risk of falling down during the filling operation, can be pivoted downwards—by overcoming the holding force of the overrunning clutch with rolling elements—until it rests on the stationary part in the area of the seat plane (10). If desired, a small amount of sausage meat material can now additionally be filled into the now closed storage receptacle (3) over its upper edge (12) extending at a higher level. Although it is necessary to overcome a slightly greater filling height for this purpose, this is not difficult in view of the fact that the main amount of the sausage meat to be filled in could already be filled in, in the open condition of the attachment (5), over the filling edge (11) estending at a lower level.

The height ($h_2$) (cf. FIG. 1), measured between the plane of action (T) of the transport element (4) and the upper edge (12) of the storage receptacle, is dimensioned such that, even if reaching fully over the upper edge, an operator will absolutely be incapable of reaching down to the seat of the transport element.

It follows that the storage receptacle can remain open at the top and—observing all the relevant safety regulations—it can be filled or refilled also in the operating condition.

The solution according to the invention guarantees that the machine is switched off automatically whenever the height which has to be overcome by an operator or rather the distance to the transport element is so small, e.g. the height ($h_1$) in FIG. 1, that the operator could reach down to the transport element.

Hence, in order to sum up, the machine according to the invention shows the advantages that, on the one hand, it provides a large volume of the storage receptacle so that large filling amounts can be treated continuously. However, in spite of the large volume which can be achieved, the handling height for the filling or the cleaning operation is so low that these operations can be carried out conveniently and in a simple manner by an operator. Furthermore, the attachment and the large funnel volume thus achieved also prevent the sausage meat from being pushed out when a rotary vane member rotates in order to avoid bridge formation. Hence, the funnel-shaped part can be filled completely up to the rim without there being any risk of flowing out. It follows that the funnel volume can be fully used for the purpose of filling, and this was not possible in the case of the known storage receptacles for the reasons mentioned at the beginning. Furthermore, the machine observes the relevant safety regulations without any grid or similar safety means on the opening side of the storage receptacle. Hence, a special advantage is that the funnel can also be refilled during operation of the machine, and this refilling is not impeded by the safety means. Finally, the storage receptacle can be opened so as to define a viewing gap—without triggering the safety deactuation operation—so that the storage receptacle can be inspected freely as in an uncomplicated manner, e.g. for the purpose of checking the filling level during the filling operation.

The funnel attachment also prevents the sausage meat from falling over the rim of the funnel during the feed operation.

What is claimed is:

1. In a machine for stuffing casings with meat comprising a housing having means for discharging meat into the casings, a storage receptacle having side walls and mounted on said housing for holding a supply of the meat, and transport means for receiving the meat from the storage receptacle and transporting it to said discharge means, the improvement wherein the lower portions of the side walls of the storage receptacle are fixed with respect to the housing with at least a part of the upper portions of side walls being pivotally mounted with respect to the lower portions so that said part can be swung away to provide access to the interior of the storage receptacle at a level lower than the top of the side walls of said receptacle.

2. The machine of claim 1, wherein all of the upper portions of the side walls form an attachment which defines an upward extension of the lower side walls of the storage receptacle, which attachment is mounted so that it can be pivoted upwards relative to said lower side walls.

3. The machine of claim 2, wherein the lower side walls form a receptacle that is at least partially, funnel-shaped.

4. The machine of claim 3, wherein the attachment is cylindrical and the lower side walls terminate in an upper cylindrical shape.

5. The machine of claim 2, wherein the attachment is pivotally connected to the lower side walls.

6. The machine of claim 5, wherein the lower edges of the attachment and the upper edges of the lower walls extend obliquely in a complimentary manner in such a way that the plane of contact between the edges ascends towards the pivotal connection.

7. The machine of claim 5, wherein the pivotal connection has means that permit the attachment to be held open in any position relative to the lower side walls.

8. The machine of claim 2, including a safety switch for switching off the transport means of the machine when the attachment is pivoted upwards.

9. The machine of claim 8, wherein the safety switch is set so that it does not react until the attachment is pivoted a given distance away from the lower side walls.

10. The machine of claim 2, wherein the storage receptacle is open at the top.

* * * * *